(12) United States Patent
Bandai et al.

(10) Patent No.: US 6,788,698 B1
(45) Date of Patent: Sep. 7, 2004

(54) DATA SWITCHING APPARATUS AND DATA SWITCHING METHOD

(75) Inventors: Ryouichi Bandai, Yokohama (JP); Kenji Sakaue, Yokohama (JP); Yasuo Unekawa, Yokohama (JP); Yuichi Miyazawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/533,592

(22) Filed: Mar. 23, 2000

(30) Foreign Application Priority Data

Mar. 23, 1999 (JP) .......................................... 11-078524

(51) Int. Cl.⁷ .............................................. H04L 12/28
(52) U.S. Cl. ...................... 370/417; 370/455; 370/537
(58) Field of Search ................................ 370/417, 428, 370/412, 429, 437, 444, 455, 465, 471, 493, 389, 353, 354, 395.1, 395.42, 400, 537, 418, 413–416; 710/200, 241

(56) References Cited

U.S. PATENT DOCUMENTS 5,815,499 A * 9/1998 Unekawa ................ 370/395.3
6,252,849 B1 * 6/2001 Rom et al. ................ 370/230

FOREIGN PATENT DOCUMENTS

JP                  9-44276                  2/1997

* cited by examiner

*Primary Examiner*—Chi Pham
*Assistant Examiner*—Alexander O. Boakye
(74) *Attorney, Agent, or Firm*—Finnegan, Henderson, Farabow, Garrett & Dunner, L.L.P.

(57) ABSTRACT

It is an object of the present invention to provide a data switching method capable of impartially selecting a plurality of input ports by a simple circuit configuration. The data switching method according to the present invention includes an up-counter, a down-counter, a counter selecting circuit for selecting either of a counted value by the up-counter or a counted value by the down-counter, a port selecting circuit for selecting one of a plurality of input ports based on an output from the counter selecting circuit, and a buffer for accumulating a packet supplied from the input port selected by the port selecting circuit. The port selecting circuit alternately selects the up-counter and the down-counter to switch the ascending order and the descending order of the import priority of the input ports at every time the packet is imported, thereby impartially selecting each of the input ports.

20 Claims, 11 Drawing Sheets

| TIME | INSIDE CONDITION | OUTPUT |
|------|------------------|--------|
| 0 | 100 | 0 |
| 1 | 010 | 0 |
| 2 | 001 | 0 |
| 3 | 110 | 1 |
| 4 | 011 | 0 |
| 5 | 111 | 1 |
| 6 | 101 | 1 |
| 7 | 100 | 1 |

FIG. 13

DATA SWITCHING APPARATUS AND DATA SWITCHING METHOD

BACKGROUND OF THE INVENTION

1. Field of the Invention

The present invention relates to a technique for controlling switching of a plurality of input ports for transmitting data to an output port, and it can be applied to, for example, an ATM switch or an IP packet switch.

2. Related Background Art

In the case of transmitting a packet from an input port to an output port, a shared buffer type or an output buffer type of switch may be provided between the input port and the output port. This type of switch analyzes header information of the packet transmitted from the input port and accumulates the packet in a buffer (logical queue) provided for each output port or each priority class of each output port, based on destination information included in the header information.

When the packets to a specific output port continuously conflicts, the number of the packets accumulated in the buffer exceeds a threshold value which is a maximum limit capable of accumulating to the buffer. In this case, a process for sequentially discarding the packets from the oldest one is performed.

Furthermore, when a vacant area for one packet is produced in the buffer and the packets from a plurality of the input port conflict, an arbitration process for determining whether or not to accumulate in the buffer or to discard the packet is performed between the conflicting packets. In this case, import priority may be established at the input ports and the packets may be accumulated in the buffer in accordance with this priority.

Figure 1:
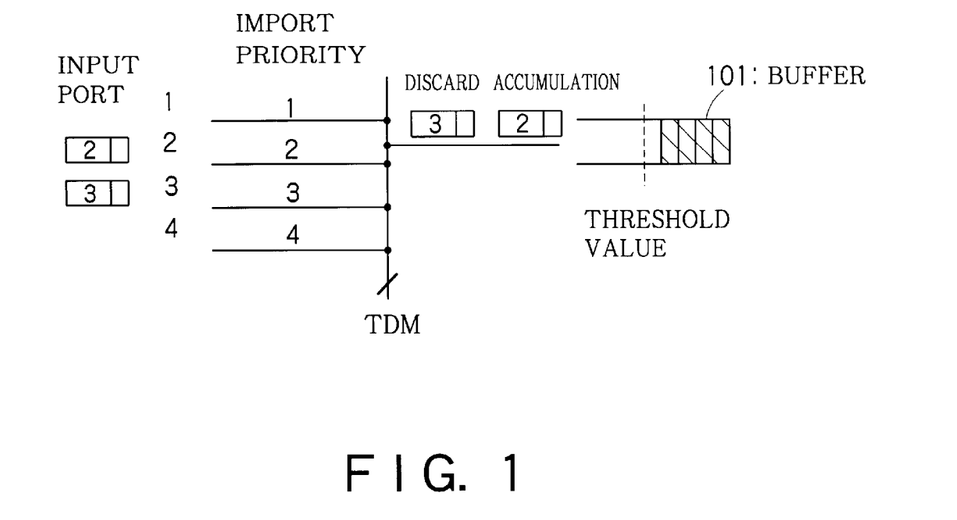
FIG. 1 is a view for explaining the conventional packet allocation processing.

FIG. 1 is a view for explaining conventional packet allocation processing, and shows an example in which the priority of the input ports is fixed. Specifically, in FIG. 1, a shared buffer type or an output buffer type of switch, which has four input ports and four output ports, is assumed.

The input ports shown in FIG. 1 are connected to a common bus, and each input port regularly sends the packets to the bus in a fixed period. Therefore, the timing division multiplex (TDM) of the bus is realized.

For example, FIG. 1 shows an example that the input ports Lin2 and Lin3 try to send the packets to the buffer 101, when a buffer 101 connected to the output port has a vacant area able to accumulate only one packet.

The import priority of the input port is fixed as shown in FIG. 1, and the input port Lin1 has the highest import priority while the input port Lin4 has the lowest priority. Therefore, when the input ports Lin2 and Lin3 conflict with each other, the packet from the input port Lin2 is necessarily selected, and the packet from the input port Lin3 is discarded. It is to be noted that smaller values of numeric figures in a column "FETCH PRIORITY" in FIG. 1 have the higher import priority.

On the other hand, FIG. 2 is a view showing a conventional example in which the import priority of the input ports is periodically changed. Specifically, the import priority of the input ports is changed in turn in synchronism with the timing for inputting the packets to the bus. For example, in FIGS. 2A, 2B and 2D, since the import priority of the input port Lin2 is higher than the import priority of the input port Lin3, the packet sent from the input port Lin2 is accumulated in the buffer 101, and the packet sent from the input port Lin3 is discarded.

Figure 2A:
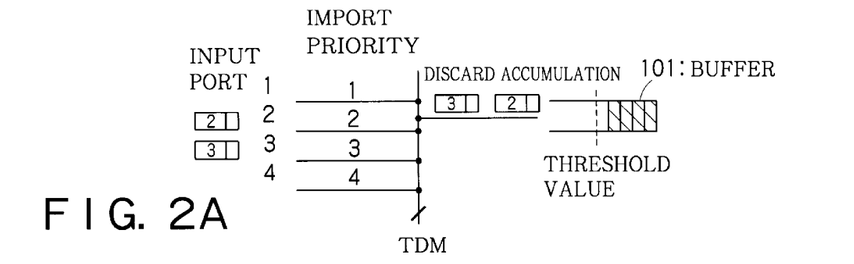
FIGS. 2A to 2D are views showing a conventional example in which an import priority of input ports is periodically changed.
Figure 2B:
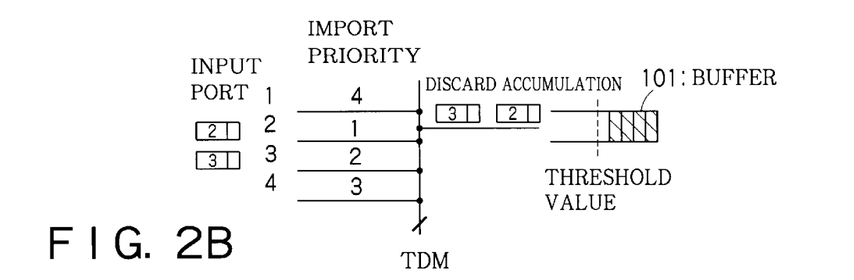
Figure 2C:
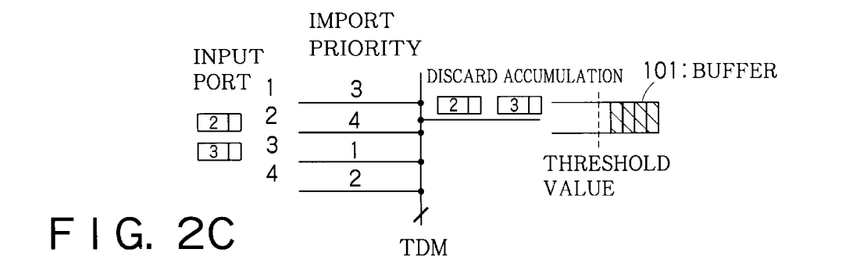
Figure 2D:
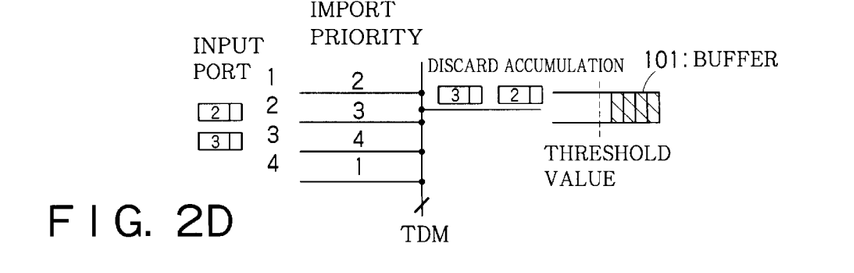

On the other hand, in FIG. 2C, since the input port Lin3 has the higher import priority than the input port Lin2, the packet from the input port Lin3 is accumulated in the buffer 101 while the packet from the input port Lin2 is discarded.

However, in FIG. 2, since the import priority of the input ports is changed constantly in the same direction, a difference of the priority occurs by each input port. That is, for example, the priority is lowered in the order of input ports Lin1, Lin2, Lin3 and Lin4. Therefore, if a conflict occurs between the input ports Lin2 and Lin3, the packet from the input port Lin2 is accumulated in the buffer 101 three times out of four times, and the packet from the input port Lin3 is accumulated in the buffer 101 only one time out of four times.

Figure 3:
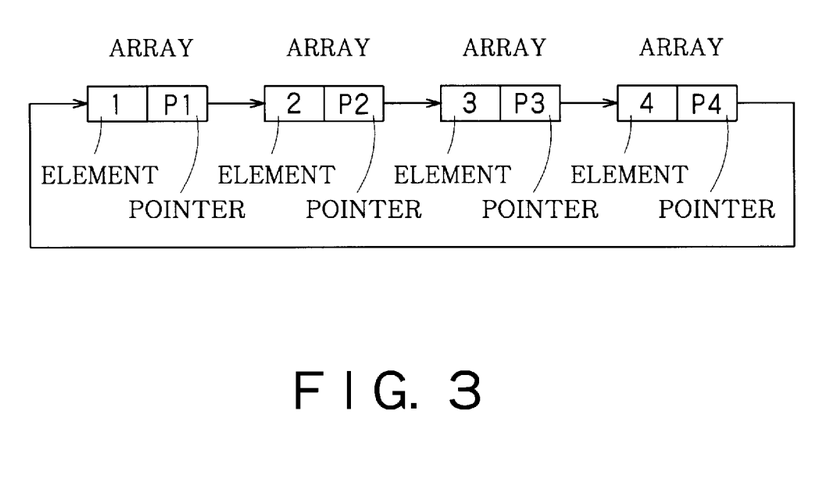
FIG. 3 is a view for explaining an outline of a round robin system.

On the other hand, there is a round robin system as a known technique for impartially selecting the respective input ports. As shown in FIG. 3, this system has a feature in which the arrays indicating the import priority are arranged in a ring shape and the array element having the highest priority just before is arranged to the rearmost position of the arrays. The arrays are changed in turn in the clockwise direction or counterclockwise direction in order to select the input port.

Each array is constituted by an element and a pointer as shown in FIG. 3. The element indicates identification information of a storage device (register) and the pointer indicates identification information of the input port. In the import priority control, the pointer (for example, P1) is first read from the element (for example, 1) at which the input port having the highest import priority may be stored this time, and the input port to be read is selected. In the next reading cycle, the pointer (for example, P2) is read from the element (for example, 2) subsequent to the element read in the previous cycle in order to select the input port in the order of the arrays.

FIG. 4 is views showing the operation of the round robin system, and illustrates an example that the input ports Lin2 and Lin3 try to send the packets to the buffer 101, when the buffer 101 connected to the output port has a vacant area in which only one packet can be stored.

Figure 4A:
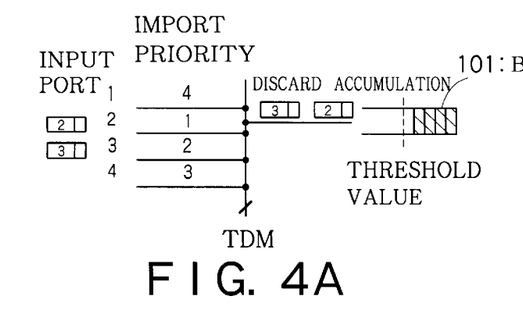
FIGS. 4A to 4H are views showing the operation of the round robin system.

When the import priority of the input ports is as shown in the column "FETCH PRIORITY" in FIG. 4A, since the import priority of the input port Lin2 is higher than that of the input port Lin3, the packet sent from the input port Lin2 is accumulated in the buffer 101.

Figure 4B:
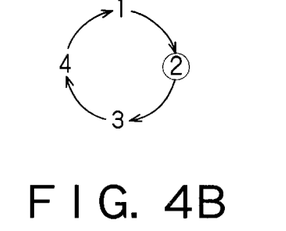
Figure 4C:
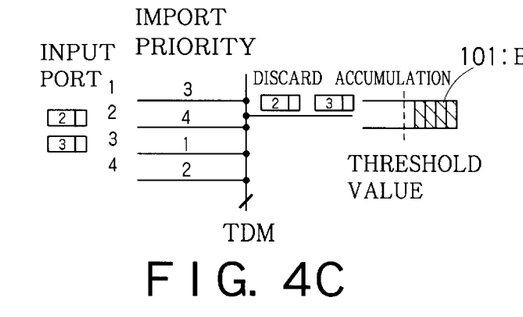
Figure 4D:
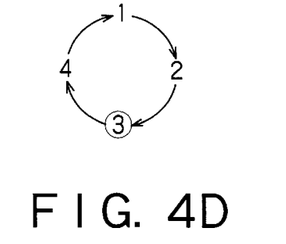

As shown in FIG. 4B, the import priority of the input ports is changed in turn in the clockwise direction. That is, in the next import timing, as shown in FIG. 4C, the import priority is changed so that the import priority of the input port Lin1 having the highest priority just before. In this case, the input port Lin2 has the higher import priority than the input port Lin3, and the packet sent from the input port Lin3 is accumulated in the buffer 101.

Figure 4E:
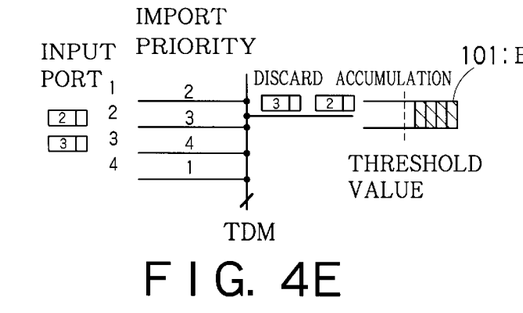
Figure 4F:
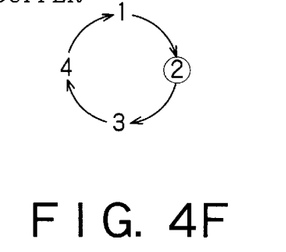
Figure 4G:
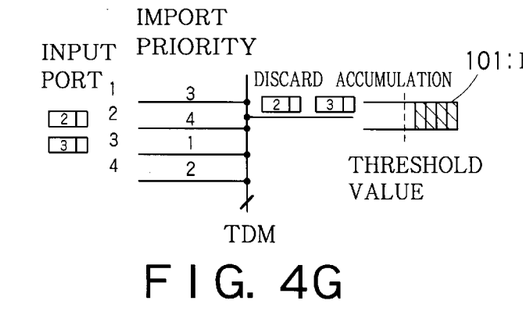
Figure 4H:
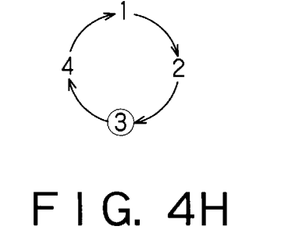

Similarly, in the next import timing, the import priority of the input port Lin3 which was highest just before becomes lowest as shown in FIG. 4E and, in the next import timing, the import priority of the input port Lin4 which was highest in the previous time becomes lowest as shown in FIG. 4G.

In FIGS. 4B, 4D, 4F and 4H, a port selected from the input ports Lin2 and Lin3 is encircled. As shown in the drawings, the input port Lin2 is selected two times out of four times and the input port Lin3 is selected in the remaining two times. In this manner, according to the round robin system, the conflicting input ports can be impartially selected.

However, in the round robin system, since the current arrays are determined in dependence on the previous arrays, the previous arrays such as shown in FIG. 3 must be always stored. Since a flip-flop or a memory is usually used for storing the arrays, the circuit is complicated.

Figure 5:
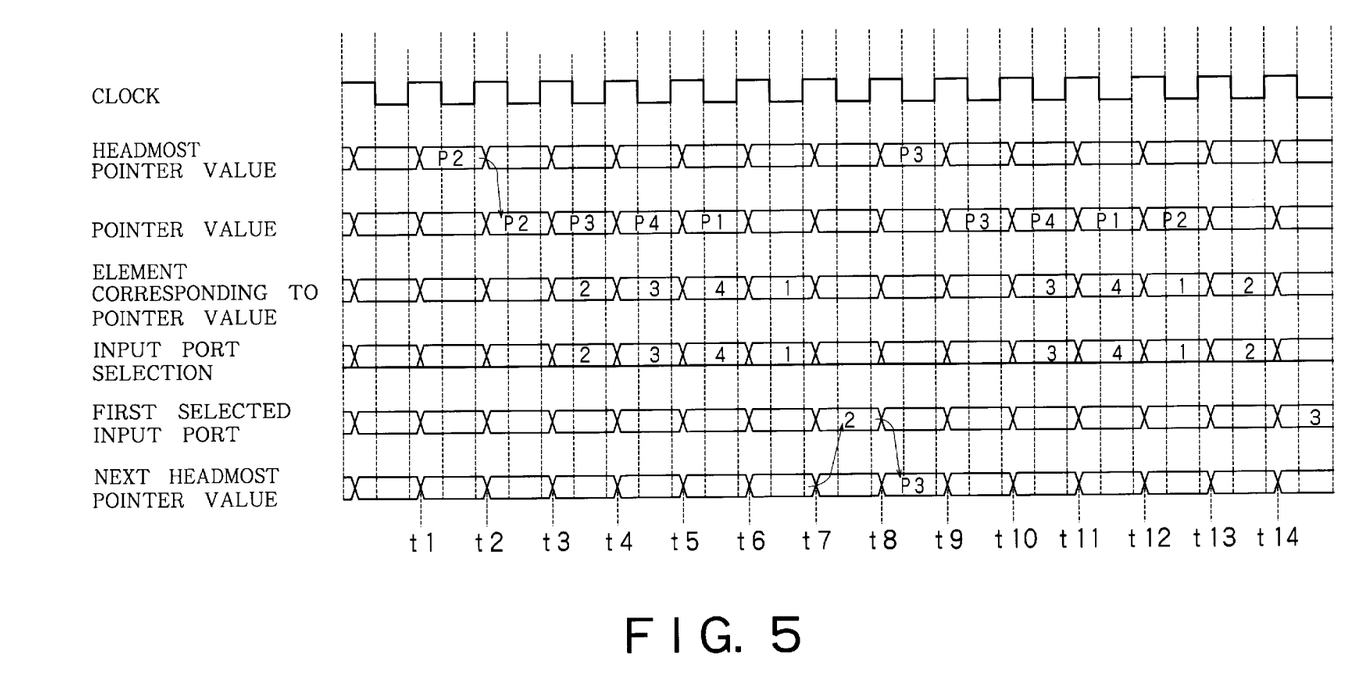
FIG. 5 is a timing chart showing a conceptual operation of the round robin system showing in FIG. 4.

FIG. 5 is a timing chart showing the conceptual operation of the round robin system showing in FIG. 4. At time t1 in FIG. 5, P2 is specified as a headmost pointer and the corresponding element is then read in sequence in synchronism with a clock by selecting the pointer value P2 as a reference at time t2 to t6. In FIG. 5, the input ports Lin2, Lin3, Lin4 and Lin1 are sequentially read as the elements.

Subsequently, at time t8, P3 is designated as a headmost pointer. Here, in order to designate P3, the firstly-designated pointer value P2 must be detected at time t7. The designated pointer value must be previously stored in order to perform such detection, and a circuit for detecting the pointer value is necessary.

Thus, the round robin system requires a circuit for detecting whether a cell is inputted to each input port and a circuit for storing data inputted to each input port, thereby complicating the circuit.

SUMMARY OF THE INVENTION

In view of the above-described drawbacks, it is an object of the present invention to provide a data switching apparatus capable of impartially selecting a plurality of input ports with a simple circuit structure.

The present invention has been developed in consideration of the above-mentioned respects, and an object thereof is to provide a data switching apparatus for selecting any of a plurality of input ports and accumulating data imported from the selected input port in a buffer connected to an output port, comprising:

priority setting means for setting a data import priority of a plurality of said input ports; and port selecting means for switching the selection of a plurality of said input ports in accordance with the set data import priority, wherein said priority setting means set a new data import priority without depending on a data import priority of a plurality of said input ports in a immediately previous data import timing so that said port selecting means impartially selects a plurality of said input ports.

According to the present invention, since a plurality of the input ports can be impartially selected without depending on the previous data import priority, the data sent from each input port can be impartially processed; as a result, a memory and the like for storing the data import priority is no longer necessary, thereby reducing a circuit scale, cutting the constituent part cost, and downsizing the apparatus.

DESCRIPTION OF THE PREFERRED EMBODIMENTS

A data switching apparatus according to the present invention will specifically be described hereinafter with reference to the drawings. The data switching apparatus according to the present invention selects any of a plurality of input ports and accumulates a packet sent from the selected input port in a buffer connected to an output port.

First Embodiment

Figure 6:
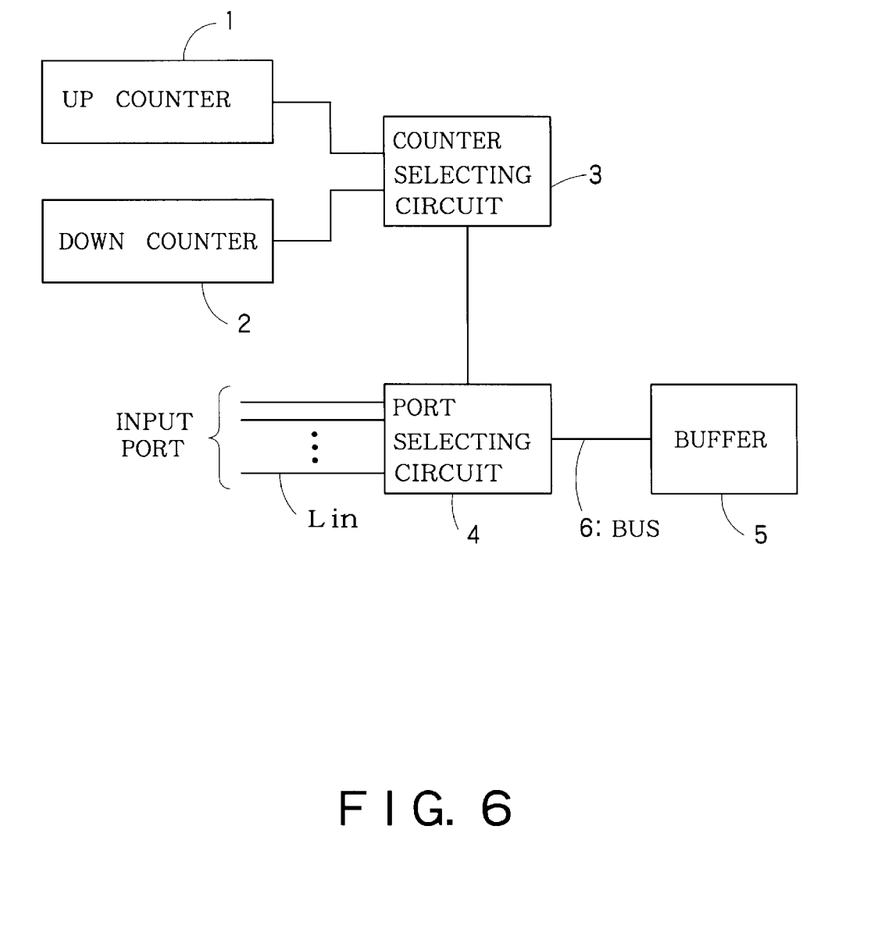
FIG. 6 is a block diagram showing a schematic structure of a first embodiment of a data switching apparatus according to the present invention.

FIG. 6 is a block diagram showing a schematic structure of a first embodiment of the data switching apparatus according to the present invention. The data switching apparatus illustrated in FIG. 6 includes an up-counter (first priority changing means) for incrementing a value by "1" in accordance with a clock, a down-counter (second priority changing means) for decrementing a value by "1" in accordance with a clock, a counter selecting circuit 3 for selecting either of a counted value by the up-counter 1 or a counted value by the down-counter 2, port selecting means 4 for selecting any of a plurality of input ports Lin based on an output from the counter selecting circuit 3, and a buffer 5 for accumulating a packet sent from the input port Lin selected by the port selecting circuit 4.

Referring to FIG. 6, the up-counter 1 and the down-counter 2 correspond to the priority setting means, and the counter selecting circuit 3 and the port selecting circuit 4 corresponds to the port selecting means.

The packet sent from the input port Lin selected by the port selecting circuit 4 is accumulated in the buffer 5 through a bus 6. The port selecting circuit 4 switches selection of the input port Lin at every time a new packet is imported. Therefore, the bus 6 can be multiplexed in the timing division manner.

The buffer 5 is provided at each output port. Each buffer 5 accumulates the packets within a range not to exceed a threshold value.

The port selecting circuit 4 showing in FIG. 6 switches the import priority of the input port Lin based on the counted value of the up-counter 1 or the down-counter 2 as will be described later.

Figure 7A:
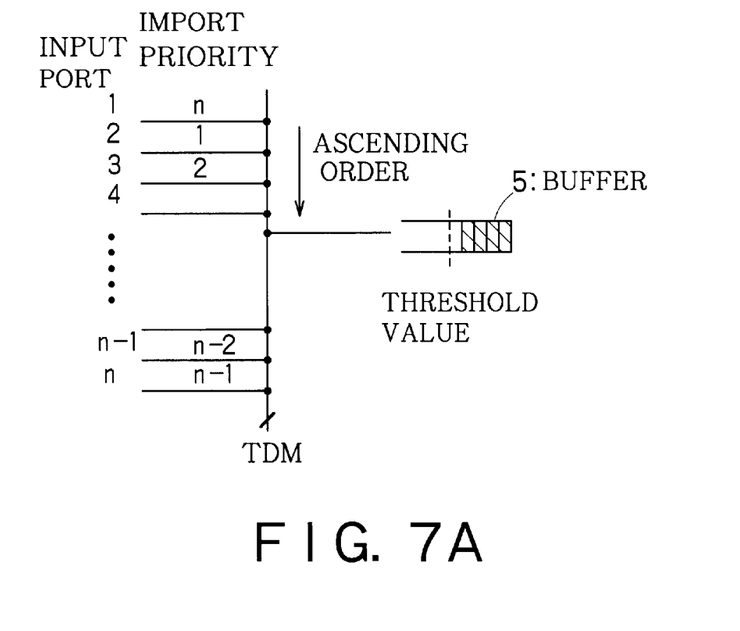
FIGS. 7A and 7B are views for explaining the operation of FIG. 1.

FIG. 7A is a view showing an example of selecting the input ports Lin1 to Linn based on the counted value of the up-counter 1. In case of FIG. 7A, the import priority of the input Lin2 is highest and the import priority of the input port Lin1 is lowest.

Figure 7B:
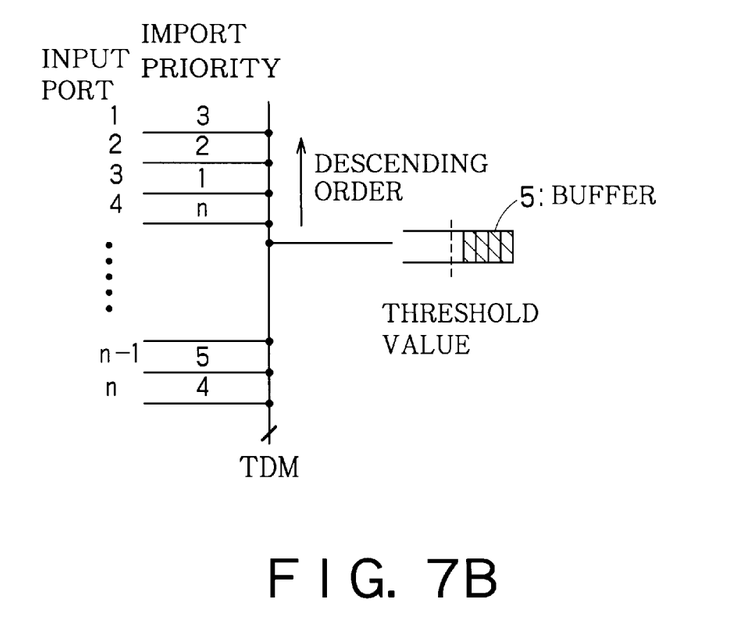

On the other hand, FIG. 7B is a view showing an example of selecting input ports Lin1 to Linn based on the counted value of the down-counter 2. In case of FIG. 7B, the import priority of the input port Lin3 is highest and that of the input port Lin4 is lowest.

The port selecting circuit 4 according to this embodiment has a feature in which the counted value of the up-counter 1 and that of the down-counter 2 are selected to each other.

FIGS. 8 and 9 are views for explaining the operation of the port selecting circuit 4. These drawings show an example that, when the buffer 5 can afford to accumulate only one packet, the input ports Lin2 and Lin3 try to send their packets to this output port.

Figure 8A:
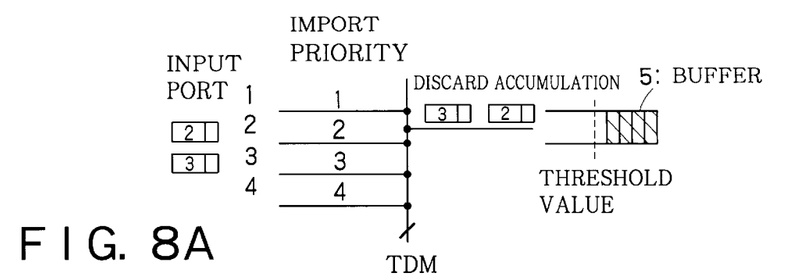
FIGS. 8A to 8D and 9A to 9D are views for explaining the operation of a port selecting circuit.

At first, as shown in FIG. 8A, the import priority of the input ports Lin1 to Lin4 is first set based on the counted value of the up-counter 1. In this case, since the import priority of the input port Lin2 is higher than that of the input port Lin3, the packet transmitted from the input port Lin2 is accumulated in the buffer 5, and the packet transmitted from the input port Lin3 is discarded.

Figure 8B:
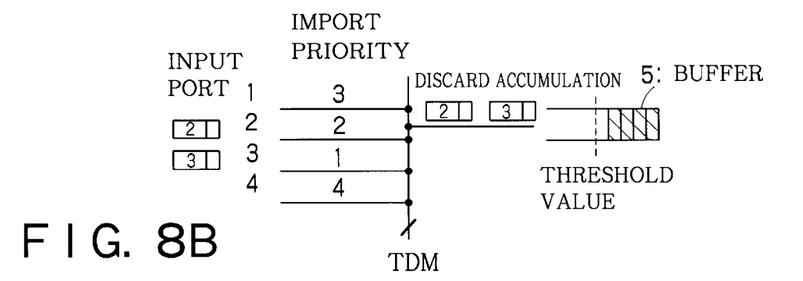

In the subsequent packet import timing, as shown in FIG. 8B, the import priority of the input ports Lin1 to Lin4 is set based on the counted value of the down-counter 2. In this case, since the input port Lin3 has the higher import priority than the input port Lin2, the packet transmitted from the input port Lin3 is accumulated in the buffer 5 and the packet transmitted from the input port Lin2 is discarded.

Figure 8C:
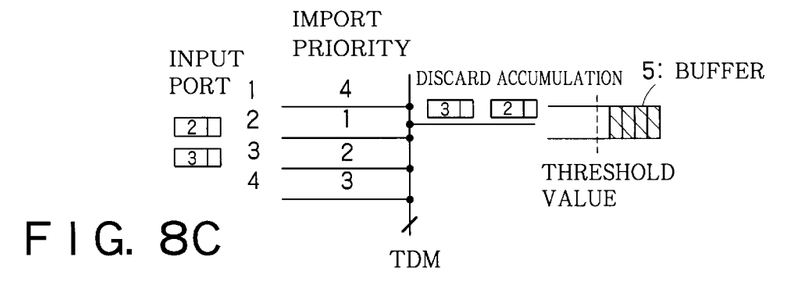

In the next packet import timing, as shown in FIG. 8C, the import priority of the input ports Lin1 to Lin4 is set based on the counted value of the up-counter 1 incremented by "1" from the value of FIG. 8A. In this case, the packet transmitted from the input port Lin2 is accumulated in buffer 5.

Figure 8D:
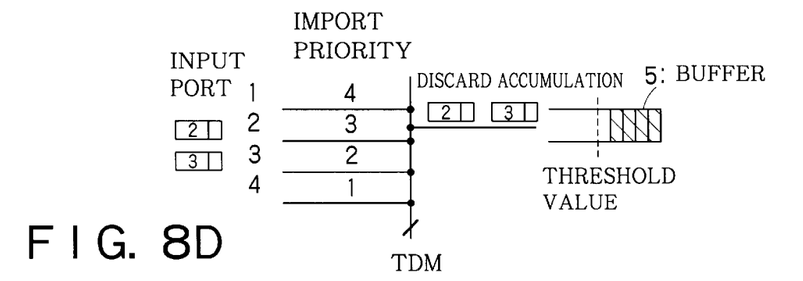

In the next packet import timing, as shown in FIG. 8D, the import priority of the input ports Lin1 to Lin4 is set based on the counted value of the down-counter 2 decremented by "1" from the value of FIG. 8B. In this case, the packet supplied from the input port Lin3 is accumulated in the buffer 5.

Figure 9A:
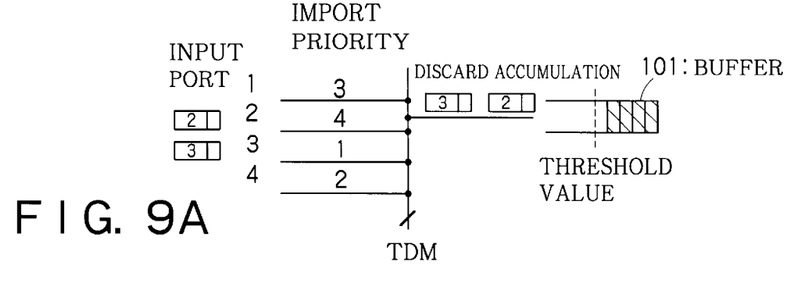
Figure 9B:
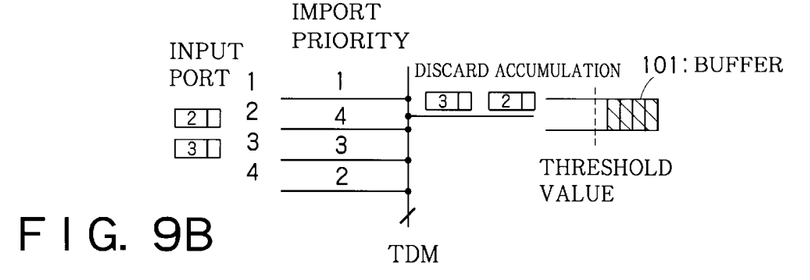
Figure 9C:
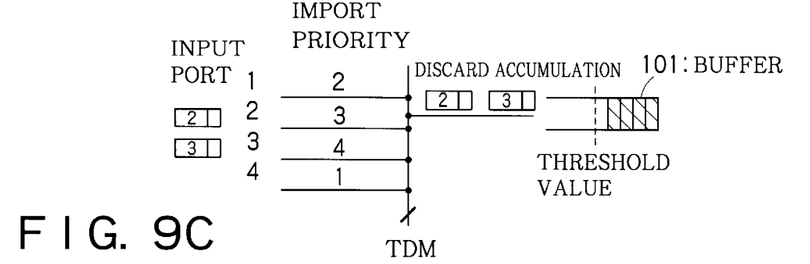
Figure 9D:
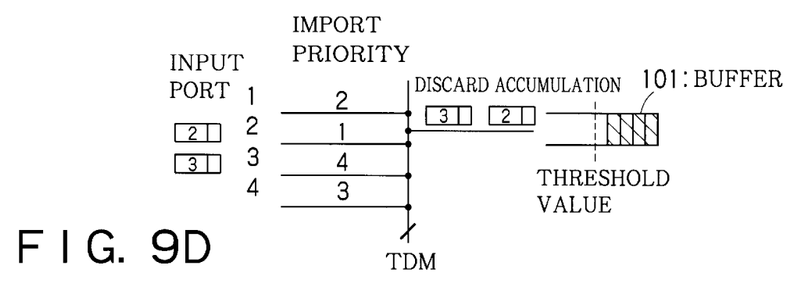

Similarly, the port selecting circuit 4 alternately choose the up-counter 1 and the down-counter 2 to select any of the input ports Lin1 to Lin4. Until the processes showing in FIG. 9D is completed, the processes of FIG. 8A to FIG. 9D is repeated.

Thus, when there are the four input ports Lin1 to Lin4, the port selecting circuit 4 repeats eight processes from FIG. 8A to FIG. 9D. Among these eight processes, packets from the input port Lin2 are accumulated in the buffer 5 in four processes showing in FIG. 8A, FIG. 8B, FIG. 8C and FIG. 8D, and packets from the input port Lin3 are accumulated in the buffer 5 in the remaining four processes showing in FIG. 8B, FIG. 8D, FIG. 9A, and FIG. 9B. That is, the port selecting circuit 4 impartially selects the input ports Lin1–Lin4.

Figure 10:
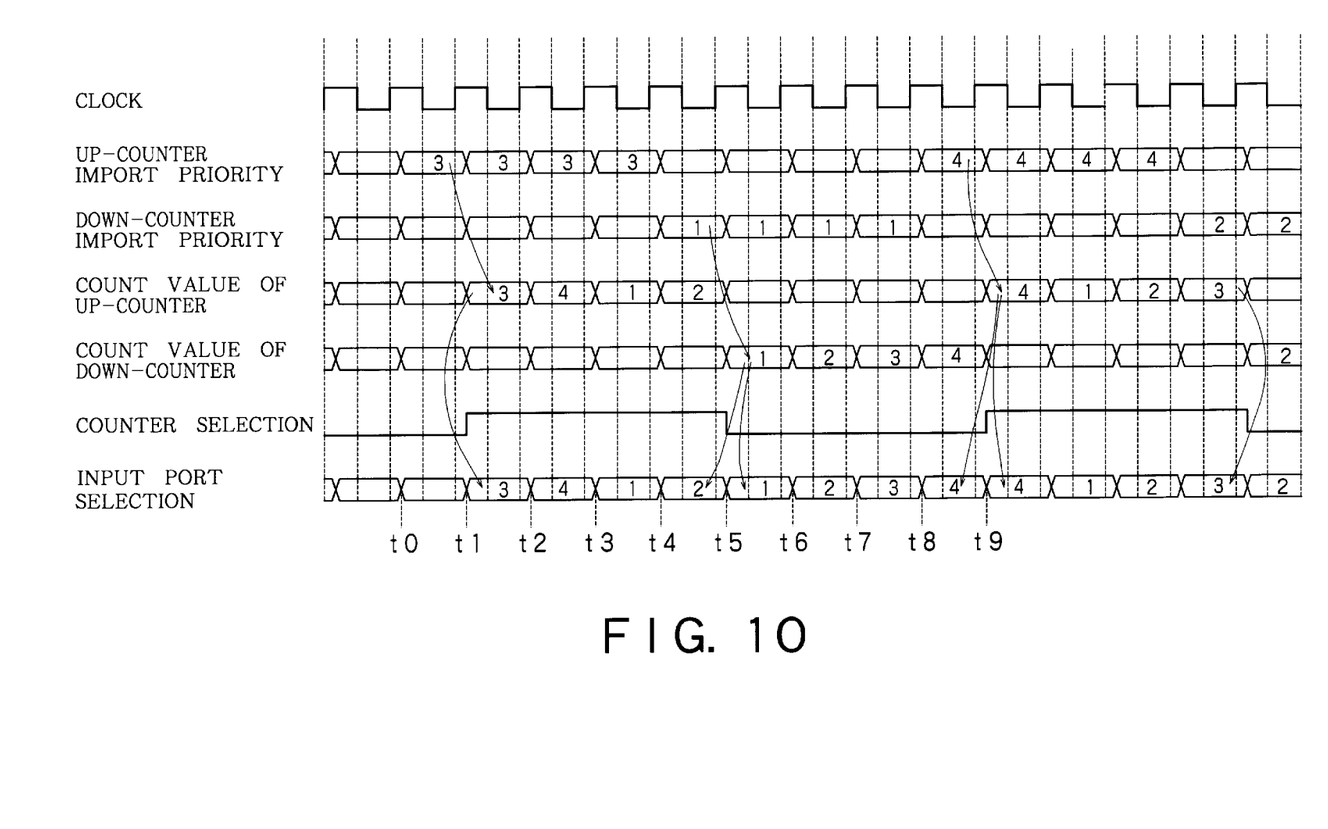
FIG. 10 is a timing chart showing a conceptual operation of a data switching apparatus showing in FIG. 7.

FIG. 10 is a timing chart showing a conceptual operation of the data switching apparatus of FIG. 7. An initial value 3 is set for the up-counter 1 at time t1 in order to start the counting operation of the up-counter 1. At time t1 to t4, since the up-counter 1 is selected, the input ports Lin3, Lin4, Lin1 and Lin2 are selected in order.

At time t5, an initial value 1 is set for the down-counter 2 in order to start the counting operation of the down-counter 2. At time t5 to t8, since the down-counter 2 is selected, the input ports Lin1, Lin2, Lin3 and Lin4 are selected in order. After then, the counted value of the up-counter 1 and that of the down-counter 2 are alternately selected.

As described above, in the first embodiment, since the import priority of the input ports Lin1 to Lin4 is changed between ascending order and descending order, it is possible to impartially select each of the input ports Lin1–Lin4. Furthermore, since the current import priority of the input ports Lin1 to Lin4 is set irrespective of the previous import priority of the input ports Lin1 to Lin4, the previous import priority does not have to be stored, thereby reducing the circuit scale.

Second Embodiment

A second embodiment has a feature in which selection of the input ports Lin is switched based on a pseudo-random number.

Figure 11:
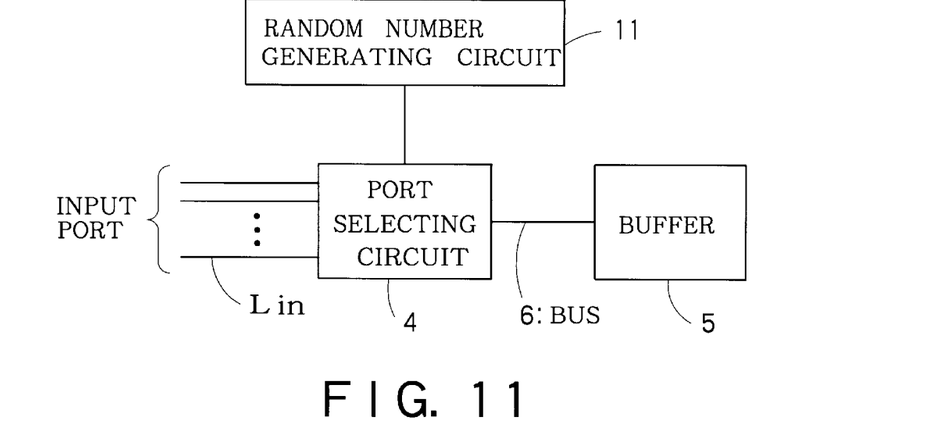
FIG. 11 is a block diagram showing a second embodiment of a data switching apparatus according to the present invention.

FIG. 11 is a block diagram showing the second embodiment of a data switching apparatus according to the present invention. The data switching apparatus showing in FIG. 11 includes a port selecting circuit 4 and a buffer 5 which are similar to those illustrated in FIG. 7, as well as a random number generating circuit (random number generating circuit) 11 for generating a pseudo-random number.

Figure 12:
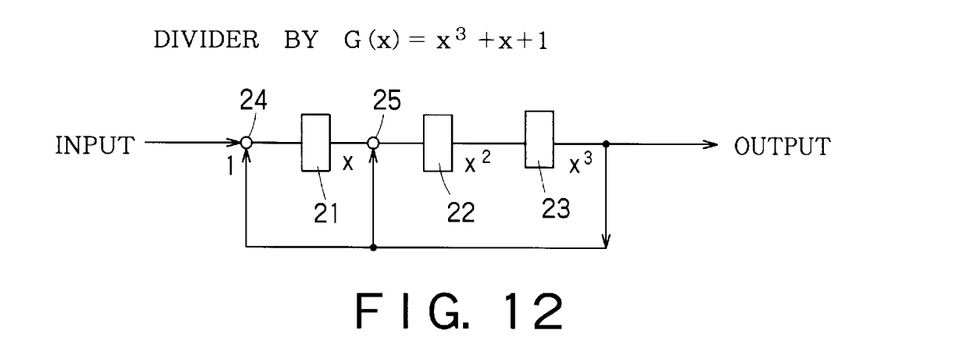
FIG. 12 is a view showing an example of a random number generating circuit.

FIG. 12 is a view showing an example of the random number generating circuit 11 which is a division circuit using a polynomial equation $G(x)=x^3+x+1$. The random number generating circuit 11 of FIG. 12 is constituted by flip-flops 21 to 23 and addition circuits 24 and 25.

Figure 13:
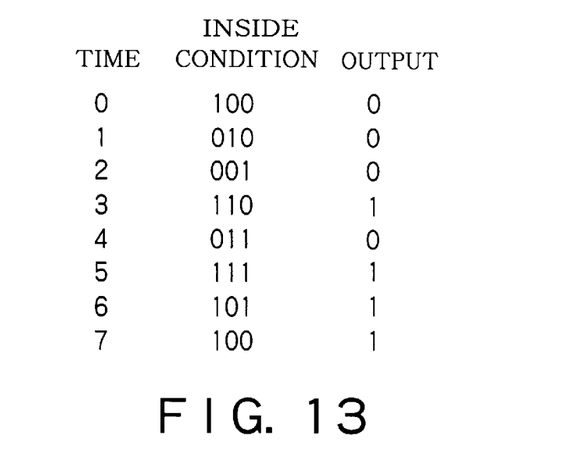
FIG. 13 is a view showing the relationship between inputs of flip-flops and an output of a flip-flop on a final stage.

In the circuit of FIG. 12, for example, when an input initial value of the respective flip-flops 21 to 23 are determined as (1,0,0) to perform the shift operation, inputs of the respective flip-flops 21 to 23 and an output of the flip-flop 23 on the final stage are as shown in FIG. 13.

As apparent from FIG. 13, in the circuit illustrated in FIG. 12, the state of the respective flip-flops 21 to 23 takes a round with seven clocks. Furthermore, all the patterns other than zero appear at input terminals of the respective flip-flops 21 to 23.

In general, when the divider constituted of m stages of the flip-flops is wire-connected so as to be equal to a coefficient of an m-th order atomic irreducible polynomial, a maximum-length series having a cycle $T=2^m-1$ can be obtained. Therefore, if m is set to a sufficiently large integer, it is possible to obtain a pseudo-random number by the input/output terminals of the respective flip-flops constituting the divider.

Since such a divider can be constituted of only the flip-flops and the adder, it is possible to simplify circuit configuration, thereby downsizing the circuit scale.

The port selecting circuit 4 of FIG. 11 switches selection of the input ports Lin based on a pseudo-random number generated from the random number generating circuit 11. Therefore, it is possible to impartially select each of the input ports Lin.

It is to be noted that the circuit for generating a pseudo-random number is not restricted to the divider such as shown in FIG. 12. For example, a table of pseudo-random numbers may be stored in a memory and the like in advance in order to switch the selection of the input ports Lin based on data read from this table.

What is claimed is:

1. A data switching apparatus for selecting any of a plurality of input ports and accumulating data imported from the selected input port in a buffer connected to an output port, comprising:

priority setting means for setting a data import priority of a plurality of said input ports; and port selecting means for switching the selection of a plurality of said input ports in accordance with the set data import priority, wherein said priority setting means set a new data import priority without depending on a data import priority of a plurality of said input ports in a immediately previous data import timing so that said port selecting means impartially selects a plurality of said input ports.

2. The data switching apparatus according to claim 1, wherein said priority setting means comprises first priority changing means for sequentially switching a data import priority of a plurality of said input ports in a predetermined direction in synchronism with a data import timing, and second priority changing means for sequentially switching a data import priority of a plurality of said input ports in a direction opposite to said predetermined direction in synchronism with a data import timing, wherein said port selecting means alternately select a data import priority obtained by said first priority changing means and a data import priority obtained by said second priority changing means, in order to switch the selection of a plurality of said input ports based on the selected data import priority.

3. The data switching apparatus according to claim 2, wherein one of said first and second priority changing means is an up-counter and the other is a down-counter, each priority of a plurality of said input ports being set in accordance with a counted value of said up-counter or said down-counter.

4. The data switching apparatus according to claim 3, wherein said port selecting means alternately selects a counted value of said up-counter and that of said down-counter, in order to switch the selection of a plurality of said input ports based on the selected counted value.

5. The data switching apparatus according to claim 4, wherein said up-counter and said down-counter carry out count-up and count-down in synchronism with a reference clock; and wherein said port selecting circuit alternately selects the counted values of the up-counter and said down-counter at each cycle number of said reference clock corresponding to the number of said input ports.

6. The data switching apparatus according to claim 1, further comprising random number generating means for generating a random number or a pseudo-random number having a long cycle in synchronism with a data import timing, wherein said port selecting means switches the selection of said input ports based on the random number or the pseudo-random number generated by said random number generating means.

7. The data switching apparatus according to claim 6, wherein said random number generating means are constituted of a division circuit using a polynomial equation.

8. The data switching apparatus according to claim 7, wherein said division circuit is constituted of only flip-flops and an adder.

9. The data switching apparatus according to claim 6, further comprising a storage device for storing a plurality of long-period pattern strings, wherein said random number generating means sequentially reads said long-period pattern strings stored in said storage device to use as random numbers.

10. The data switching apparatus according to claim 1, wherein a fixed-length cell or a variable-length packet is transmitted as input data from each of a plurality of said input ports, and further comprising a bus which is provided between said port selecting means and said buffer and to which the packets from a plurality of said input ports are transferred on the condition multiplexed in a time division manner.

11. A data switching method for selecting any of a plurality of input ports and accumulating data imported from the selected input port in a buffer connected to an output port, said method comprising the steps of:

setting a data import priority of a plurality of said input ports; and switching the selection of a plurality of said input ports in accordance with the set data import priority, wherein said step of setting the priority sets a new data import priority so that a plurality of said input ports are impartially selected by said step of switching the selection of said input ports without depending on a data import priority of a plurality of said input ports in a previous data import timing.

12. The data switching method according to claim 11, wherein said step of setting the priority further comprises the steps of:

sequentially switching a data import priority of a plurality of said input ports in a predetermined direction in synchronism with a data import timing; and sequentially switching a data import priority of a plurality of said input ports in a direction opposite to said predetermined direction in synchronism with a data import timing, wherein said step of switching the selection of said input ports alternately selects said step of switching the priority in a predetermined direction and said step of switching the priority in a direction opposite to said predetermined direction, in order to switch the selection of a plurality of said input ports based on the selected data import priority.

13. The data switching method according to claim 12, wherein one of said step of switching the priority in a predetermined direction and said step of switching the priority in a direction opposite to said predetermined direction uses an up-counter to perform processing, and the other uses a down-counter to perform processing, and wherein each priority of a plurality of said input ports is set in accordance with a counted value of said up-counter or said down-counter.

14. The data switching method according to claim 13, wherein said step of switching the selection of said input ports alternately selects a counted value of said up-counter and a counted value of said down-counter to switch the selection of a plurality of said input ports based on the selected counted value.

15. The data switching method according to claim 14, wherein said up-counter and said down-counter carry out count-up and count-down in synchronism with a reference clock, and wherein said step of switching the selection of the plurality of said input ports alternately selects the counted values of said up-counter and said down-counter at each cycle number of said reference clock corresponding to the number of said input ports.

16. The data switching method according to claim 11, further comprising a step of generating a random number or a pseudo-random number having a long cycle in synchronism with a data import timing, wherein said step of switching the selection of said input ports switches the selection of said input ports based on the generated random number or pseudo-random number.

17. The data switching method according to claim 16, wherein said step of generating the random number or the pseudo-random number uses a division circuit based on a polynomial equation to generate the random number or the pseudo-random number having the long cycle.

18. The data switching method according to claim 17, wherein said division circuit performs division by using only flip-flops and an adder.

19. The data switching method according to claim 16, further comprising a step of storing a plurality of long-period pattern strings, wherein said step of generating the random number or the pseudo-random number have a long cycle sequentially reads said stored long-period pattern strings to use as the random number.

20. The data switching method according to claim 11, wherein each of a plurality of said input ports transmits a fixed-length cell or a variable-length packet which is input data, and wherein packets from a plurality of said input ports are transmitted on the condition multiplexed in a time division manner through a bus provided between said port selecting means and said buffer.

\* \* \* \* \*